UNITED STATES PATENT OFFICE.

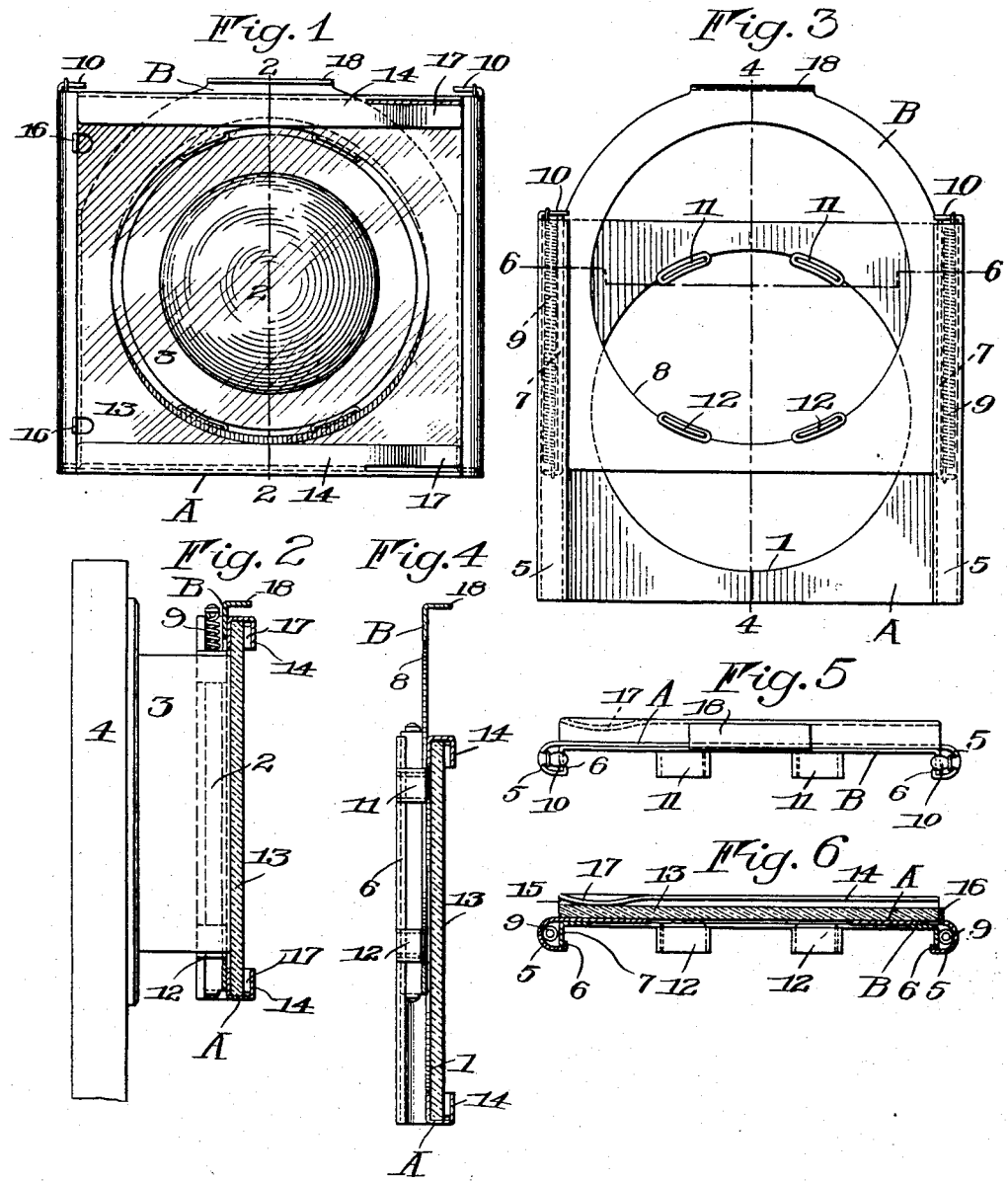
J. T. CLARKE.
RAY FILTER.
APPLICATION FILED JUNE 1, 1914.
1,151,245. Patented Aug. 24, 1915.
Inventor
Joseph Thacher Clarke

JOSEPH THACHER CLARKE, OF HARROW, ENGLAND, ASSIGNOR TO EASTMAN KODAK COMPANY, OF ROCHESTER, NEW YORK, A CORPORATION OF NEW YORK.

RAY-FILTER.

1,151,245.   Specification of Letters Patent.   Patented Aug. 24, 1915.

Application filed June 1, 1914. Serial No. 842,161.

*To all whom it may concern:*

Be it known that I, JOSEPH THACHER CLARKE, of Harrow, England, have invented certain new and useful Improvements in Ray-Filters; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple, neat and convenient form of ray filter attachment for the lens tubes of cameras, which may be easily and quickly removed from, or applied to lens tubes of the ordinary forms and by means of which light admitted to the lens is filtered through a colored screen whereby its actinic effect is controlled for well known purposes.

A further object of the invention is to provide a filter device or holder in which the filtering screen is removably held so that it may be taken off at will without, if desired, removing the holder or a screen of another intensity substituted therefor.

To these and other ends the invention consists in certain improvements and combinations of parts, all as will be hereinafter more fully described, the novel features being pointed out in the claims at the end of the specification.

In the drawings, Figure 1 is a front elevation of a ray filter constructed in accordance with and illustrating one embodiment of my invention, the same being shown in operative position on a lens tube. Fig. 2 is a vertical sectional view taken substantially on the line 2—2 of Fig. 1. Fig. 3 is a rear elevation of the holder detached and with the screen removed. Fig. 4 is a section taken substantially on the line 4—4 of Fig. 3. Fig. 5 is a top plan view, and Fig. 6 is a horizontal section taken substantially on the line 6—6 of Fig. 3.

Similar reference numerals throughout the several views indicate the same parts.

In the present embodiment of the invention, my ray filter attachment comprises two rectangular sheet metal frames A and B. The outer, and what I may term the main frame A has a central opening 1 as large as the lens and lens tube of the camera, such parts being shown conventionally in Figs. 1 and 2 at 2 and 3, respectively, mounted on a lens board 4. The vertical edges of the main frame plate are flanged rearwardly at 5 or beaded to constitute parallel guides embodying an inwardly turned interlocking flange or shoulder 6. The inner frame B is also flanged rearwardly at 7 along its vertical edges to occupy and slide in the guides 5 in engagement with the interlocking flange 6. Said frame is also provided with a central opening 8 of about the size of the opening 1 in the frame A and the two openings come into and out of register with each other when the frames are moved relatively. Coil springs 9 housed within the flanged guides 5 tend to move the frames and hence the openings therein out of register in the relative positions shown in Fig. 3. For this purpose, one end of each spring is connected to an inwardly turned ear 10 at the upper extremity of the guide 5 while the other end is connected to a laterally turned ear at the lower extremity of the adjacent flange 7 so that the springs as well as the last mentioned flanges are housed within the guides 5 of the main frame A.

At the upper side of the opening 1 in the frame A are two rearwardly turned lugs 11 that may be struck up from the material of the plate on the margin of the opening. Opposite to these lugs are two similar lugs 12, on the lower margin of the opening 8 in the movable frame B, both sets of lugs being preferably covered with rubber tubing or otherwise rendered non-abrasive. It will be seen that the two sets of lugs are arranged in opposition and move toward and from each other as the plates move relatively and the openings therein move into and out of register.

The screen or ray filter proper that it is the object to place over the end of the lens tube may consist of a colored glass plate 13. A seat is formed for this plate in the present instance by flanging forwardly the upper and lower or horizontal edges of the frame plate A as at 14. The glass may be inserted in or withdrawn from its seat from one side of the frame which is open for this purpose at 15 while at the opposite side the seat is closed against the further passage of the screen by projecting abutments 16. Thus, similar screens, differing, however, in ray filtering properties may be interchanged in the seat or removed easily for cleaning or other purposes. Spring fingers 17 formed from parts of the flanges 14 yieldingly grip the screens to hold them firmly against the seat and to prevent inadvertent movement thereof.

In operation, the two frames A and B and the openings 1 and 8 therein are pressed into register and the lugs 11 and 12 respectively forced apart against the tensions of the springs 9 by placing the tips of the fingers beneath the lower edge of the plate A and pushing with the thumb on a thumb piece 18 formed by a forwardly turned flange at the top of the frame B. The said lugs are then passed over the end of the lens tube and the frames released whereupon the action of the springs in tending to force the frames apart again will cause the lugs to grip the lens tubes on opposite sides in the manner of clamping jaws and retain the ray filter holder in place thereon. Thus the screen 13 will cover the lens at the end of the tube and light admitted to the lens must first pass through the screen.

It will be seen that the attachment may be as readily removed by much the same operation though the screens may be interchanged without requiring such removal.

The device is light and compact being very thin overall, and in the present embodiment can be stamped from sheet material and easily assembled at small cost.

I claim as my invention:

1. A ray filter comprising two relatively movable frames adapted to grip a lens tube, one of said frames being arranged to carry a screen in fixed relation thereto.

2. A ray filter comprising two relatively movable frames guided one upon the other and having jaws adapted to engage respectively upon opposite sides of a lens tube, one of the frames being provided with a relatively fixed screen arranged to cover the end of such lens tube.

3. A ray filter comprising two relatively movable frames guided one upon the other to move into and out of register, and to grip a lens tube between them when in register, one of said members being a screen carrying frame, of a spring tending to move the frames out of register and exert a gripping pressure on the lens tube.

4. In a ray filter, the combination with a screen carrying frame having lateral guides and a central opening and lens tube engaging jaws at one side of the opening, of a second frame guided in the first and provided with lens tube engaging jaws opposite those on the screen frame and a spring acting upon the frames to operate the respective jaws toward each other.

5. In a ray filter, the combination with a frame having a central opening and provided with a screen seat on one face, and lens tube engaging jaws projecting from the other face, of a second frame arranged on the last mentioned face of the first frame and guided on the latter to move relatively thereto, lens tube engaging jaws on said second frame arranged opposite to those on the first and a spring acting upon the frames to move the respective sets of jaws toward each other.

6. In a ray filter, the combination with a screen carrying frame composed of an apertured plate having flanged edges forming guides, and having gripping portions adapted to engage one side of a lens tube, of a movable frame having flanged edges coöperating with the flanged edges of the screen carrying frame as guides, gripping portions on the movable frame arranged opposite to those on the first and a spring acting upon the frames to move the respective sets of jaws toward each other.

7. In a ray filter, the combination with a screen carrying frame composed of an apertured plate having flanged edges forming guides, and having gripping portions adapted to engage one side of a lens tube, of a movable frame having flanged edges coöperating with the flanged edges of the screen carrying frame as guides, gripping portions on the movable frame arranged opposite to those on the first and springs housed within the flanged guides of the screen carrying frame and acting upon the frames to move the respective sets of jaws toward each other.

8. A ray filter comprising two relatively movable gripping members adapted to engage a lens tube one of said members embodying an apertured plate, two opposite edges of which are flanged rearwardly to provide guides for the other gripping member, while the other two opposite edges of said plate are flanged forwardly to provide a seat for a screen positioned across the aperture and the end of a lens tube on which the filter is engaged.

JOSEPH THACHER CLARKE.

Witnesses:
H. D. JAMESON,
O. J. WORTH.

Copies of this patent may be obtained for five cents each, by addressing the "Commissioner of Patents, Washington, D. C."